(12) United States Patent
Häussermann et al.

(10) Patent No.: US 12,350,822 B2
(45) Date of Patent: Jul. 8, 2025

(54) PROTECTIVE COVERING FOR A ROBOT HAND AXIS

(71) Applicant: Dürr Systems AG, Bietigheim-Bissingen (DE)

(72) Inventors: Patrick Häussermann, Korb (DE); Peter Marquardt, Steinheim a. d. Murr (DE); Joachim Schneider, Tauberbischofsheim (DE); Ralph Glaser, Schömberg (DE)

( * ) Notice: Subject to any disclaimer, the term of this patent is extended or adjusted under 35 U.S.C. 154(b) by 30 days.

(21) Appl. No.: 18/262,582

(22) PCT Filed: Jan. 27, 2022

(86) PCT No.: PCT/EP2022/051901
§ 371 (c)(1),
(2) Date: Jul. 24, 2023

(87) PCT Pub. No.: WO2022/179793
PCT Pub. Date: Sep. 1, 2022

(65) Prior Publication Data
US 2024/0300122 A1  Sep. 12, 2024

(30) Foreign Application Priority Data

Feb. 24, 2021 (DE) .................... 10 2021 104 378.6

(51) Int. Cl.
*B25J 19/00* (2006.01)
*B05B 13/04* (2006.01)

(52) U.S. Cl.
CPC ....... *B25J 19/0083* (2013.01); *B05B 13/0431* (2013.01)

(58) Field of Classification Search
CPC ... B25J 19/0075; B25J 19/0083; B05B 12/32; B05B 13/0431
See application file for complete search history.

(56) References Cited

U.S. PATENT DOCUMENTS 4,762,455 A    8/1988  Coughlan et al.
4,777,868 A *  10/1988 Larsson ................ F15B 15/103
                                                  92/42

(Continued)

FOREIGN PATENT DOCUMENTS

DE    2745753 A1    4/1978
DE    8323723 U1   12/1983

(Continued)

OTHER PUBLICATIONS

International Search Report and Written Opinion for PCT/EP2022/051901 mailed May 10, 2022 (with English translation).

(Continued)

*Primary Examiner* — Jake Cook
(74) *Attorney, Agent, or Firm* — Taft Stettinius & Hollister LLP; Thomas E. Bejin; John W. Carpenter

(57) ABSTRACT

The disclosure relates to a protective covering for a robot hand axis of a robot, in particular in a painting robot. The protective covering according to the disclosure has a protective sheath for at least partially enclosing the robot hand axis. Furthermore, the protective covering according to the disclosure has a proximal protective sheath fastening for fastening the protective sheath to a fastening point on a proximal component of the robot hand axis or on the robot arm of the robot. Furthermore, the protective covering according to the disclosure has a distal protective sheath fastening for fastening the protective sheath to the tool. The disclosure provides that the proximal protective sheath fastening and preferably also the distal protective sheath fastening allows a rotational movement of the protective sheath relative to the fastening point on the proximal component of the robot hand axis or on the robot arm of the robot.

20 Claims, 3 Drawing Sheets

(56) References Cited

U.S. PATENT DOCUMENTS

| | | | | |
|---|---|---|---|---|
| 6,039,068 | A | * | 3/2000 | Tessier ................. B25J 19/0083 |
| | | | | 901/49 |
| 6,082,290 | A | * | 7/2000 | Conlin ................... B25J 17/025 |
| | | | | 901/49 |
| 6,346,150 | B1 | * | 2/2002 | Conlin ................... B25J 17/025 |
| | | | | 118/326 |
| 8,740,881 | B2 | | 6/2014 | Ortmaier et al. |
| 10,906,171 | B2 | * | 2/2021 | Hahakura .............. H02K 11/33 |
| 2002/0144565 | A1 | | 10/2002 | Ambrose |
| 2012/0055595 | A1 | | 3/2012 | Schodowski |
| 2018/0076298 | A1 | | 3/2018 | D'Andreta |

FOREIGN PATENT DOCUMENTS

| | | |
|---|---|---|
| DE | 8814906 U1 | 1/1989 |
| DE | 10 2008 005 901 A1 | 8/2009 |
| EP | 0937551 A1 | 8/1999 |
| WO | 09903653 A1 | 1/1999 |

OTHER PUBLICATIONS

Office Action from German Patent Office for related application No. DE102021104378.6 mailed May 31, 2022 (10 pages; with English machine translation).

* cited by examiner

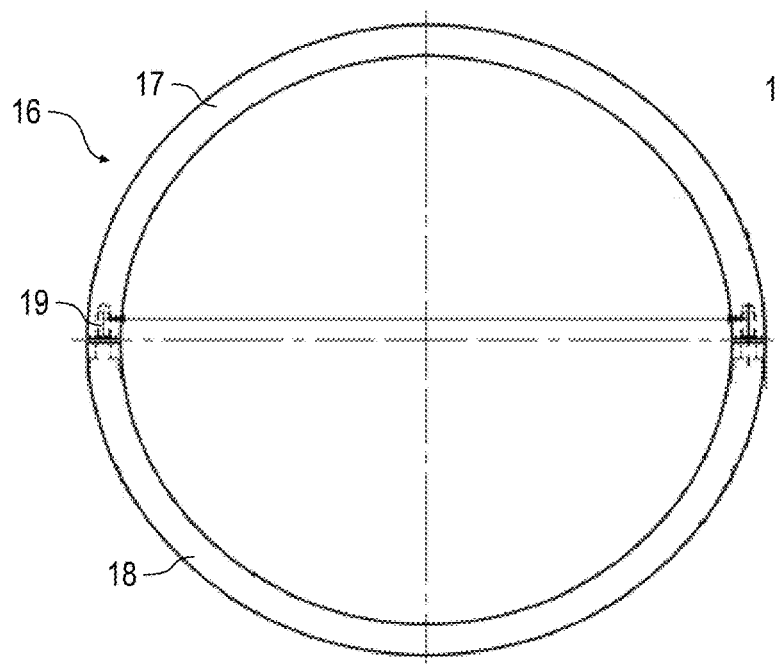 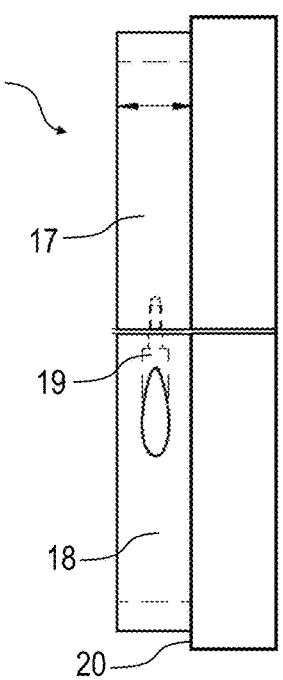
Fig. 3A　　　　　　　Fig. 3B
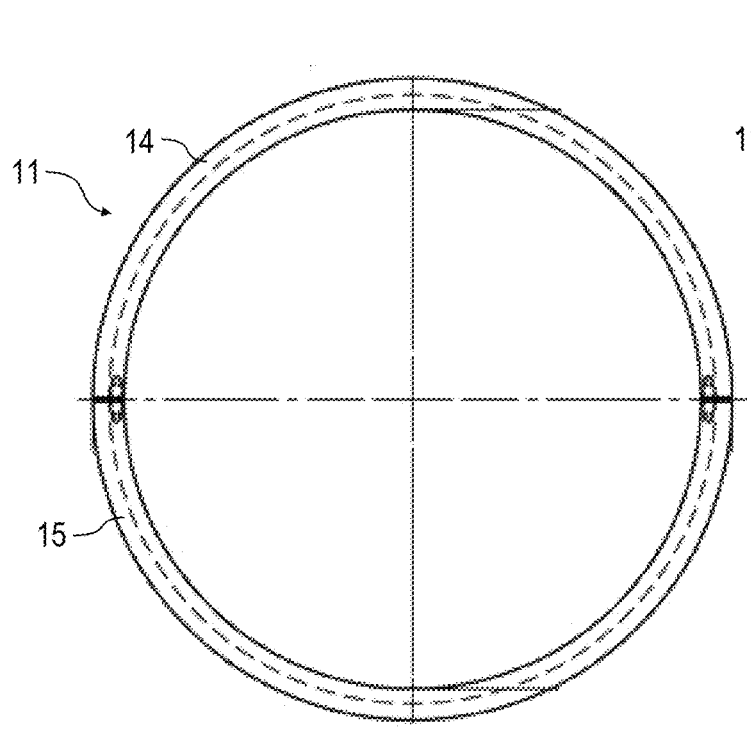 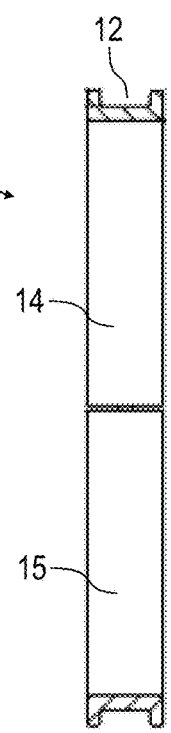
Fig. 4A　　　　　　　Fig. 4B

PROTECTIVE COVERING FOR A ROBOT HAND AXIS

CROSS-REFERENCE TO RELATED APPLICATIONS

This application is a national stage of, and claims priority to, Patent Cooperation Treaty Application No. PCT/EP2022/051901, filed on Jan. 27, 2022, which application claims priority to German Application No. DE 10 2021 104 378.6, filed on Feb. 24, 2021, which applications are hereby incorporated herein by reference in their entireties.

FIELD

The disclosure relates to a protective covering for a robot hand axis of a robot, in particular in a painting robot with a rotary atomizer.

BACKGROUND

In modern painting plants for painting motor vehicle body components, multi-axis painting robots are normally used which guide a rotary atomizer as an application device, the rotary atomizer being mounted on a multi-axis robot hand axis. The aim here is to prevent the robot hand axis from becoming contaminated by the paint sprayed off by the rotary atomizer. It is therefore known from the prior art to use so-called protective socks (protective covers), which are pulled over the robot hand axis and thus protect it from contamination by the sprayed paint. These so-called protective stockings consist of a protective sheath which is taped to the rotary atomizer at its distal end. At its proximal end, on the other hand, the protective sheath is attached to a proximal component of the robot hand axis, whereby this attachment can also be made by means of an adhesive tape.

The problem here is that the elastic protective sheath offers mechanical resistance to the movements of the robot hand axis. On the one hand, this can lead to the protective sheath becoming detached due to the movements of the robot hand axis, which must be prevented. On the other hand, the movements of the robot hand axis during operation can also cause the protective sheath to twist, which can cause paint particles to come loose from the protective sheath, which can lead to contamination in the environment of the painting robot. In addition, there is also the possibility that the protective sheath mechanically overloads the robot drive due to its elasticity, so that the desired robot movements cannot be carried out or cannot be carried out with the desired positioning accuracy.

In addition, there is the possibility, especially in a state soiled by paint material, of the stocking tearing under the resulting tensile load. The tensile load can be counteracted by lengthening the stocking material, but this also increases the volume of the area to be protected by the stocking, which leads to an increased risk of contact with the object to be painted. This is particularly the case when the space for movement is already limited, as is the case, for example, when painting the interior of a vehicle.

BRIEF DESCRIPTION OF THE DRAWINGS

FIG. 3A shows an axial view of a clamping ring of the protective covering according to the disclosure.

FIG. 3B shows a side view of the clamping ring from FIG. 3A.

FIG. 4A shows an axial view of a rotatable sliding ring of the protective covering according to the disclosure.

FIG. 4B shows a side view of the rotatable sliding ring of FIG. 4A.

DETAILED DESCRIPTION

Figure 1:
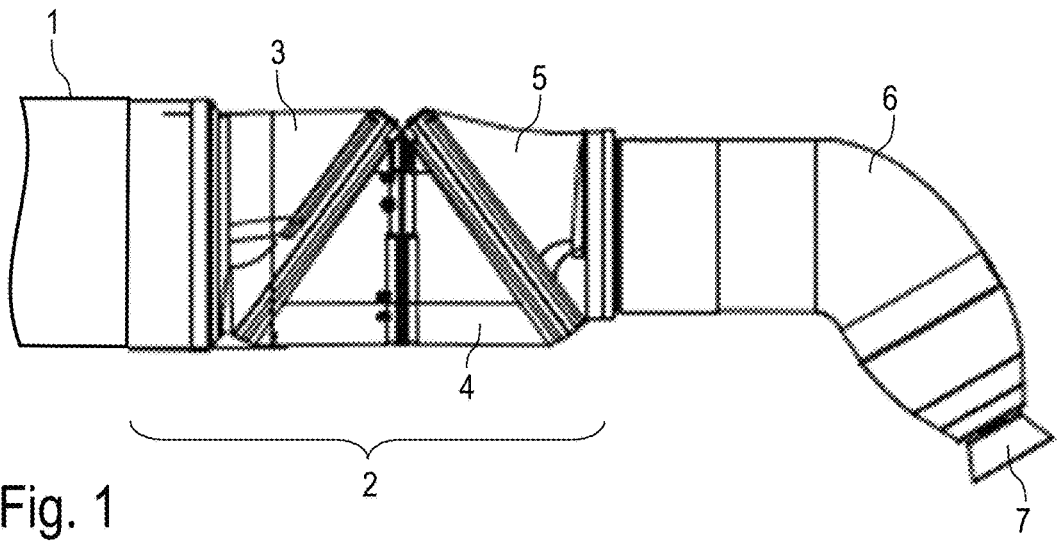
FIG. 1 shows a side view of a robot hand axis guiding a rotary atomizer.

The protective covering according to the disclosure is particularly suitable for protecting a robot hand axis of a painting robot. However, the disclosure is also generally applicable to a coating robot that applies other types of coating materials, such as adhesives, insulating materials, sealants, to name just a few examples. Furthermore, it is also possible in principle for the protective covering to be designed for another type of robot carrying a tool other than a rotary atomizer.

In accordance with the known protective covering described at the beginning, the protective covering according to the disclosure comprises a protective sheath which is designed to at least partially enclose the robot hand axis so that the robot hand axis is protected from contamination. For example, the protective sheath for this purpose can comprise an elastic and paint-impermeable film, as is known per se from the prior art.

Furthermore, in accordance with the known protective covering described at the outset, the protective covering according to the disclosure comprises a proximal protective sheath fastening for fastening the protective sheath to a fastening point on a proximal component of the robot hand axis or on the distal robot arm ("Arm 2") of the robot. Thus, in the case of the protective covering according to the disclosure, the protective sheath can optionally be attached to the robot hand axis itself or to the adjacent distal robot arm, which is the purpose of the proximal protective sheath fastening.

Furthermore, the protective covering according to the disclosure also has a distal protective sheath fastening, which is used to attach the protective sheath to the tool (e.g. rotary atomizer) of the robot. For this purpose, for example, an adhesive tape can be used, as is also the case in the prior art.

The disclosure is distinguished from the known protective covering described at the beginning by the fact that the proximal protective sheath fastening enables a rotational movement of the protective sheath relative to the fastening point on the proximal component of the robot hand axis or on the robot arm of the robot. Thus, when the robot hand axis is moved, the protective sheath can follow the robot movement. On the one hand, this prevents the protective sheath from becoming detached or twisted from the robot hand axis due to the movements of the robot. On the other hand, however, this also prevents the protective covering from offering excessive resistance to the robot movement, which could mechanically overload the robot drive.

In an embodiment of the disclosure, the proximal protective sheath fastening additionally forms an axial stop that absorbs axial tensile forces from the tool (e.g., rotary atomizer) and thus prevents the protective sheath from being pulled away from the robot hand axis in the distal direction during operation. The axial stop on the proximal protective sheath fastening thus prevents the protective sheath from being pulled off the proximal protective sheath fastening in the distal direction due to the robot movements occurring during operation.

In an embodiment of the disclosure, the proximal protective sheath fastening thus fulfills two technical functions. On the one hand, the proximal protective sheath fastening enables the protective sheath to rotate freely so that the protective sheath can follow the robot movement. On the other hand, the proximal protective sheath fastening also forms an at least one-sided axial fixation of the protective sheath so that it cannot slip off the robot hand axis.

In an embodiment of the disclosure, the proximal protective sheath fastening comprises an immovable ring, which can also be referred to as a clamping ring, and is immovably fastened to the robot arm of the robot or to a proximal component of the robot hand axis, in particular by means of screw tensioning. The term immobility used in the context of the disclosure in relation to the clamping ring refers here to the relative movement between the ring on the one hand and the fastening point on the robot arm or on the proximal component of the robot hand axis on the other hand. The immovable ring is thus fixed firmly to the fastening point.

Furthermore, in an embodiment, the proximal protective sheath fastening comprises a rotatable ring, also referred to as a sliding ring, which is attached to the immovable ring (clamping ring) and can be rotated relative to the immovable ring. In this case, the protective sheath is attached to the rotatable ring with its proximal end, so that the protective sheath with the rotatable ring can rotate relative to the robot arm, since the two rings (clamping ring and sliding ring) can rotate relative to each other.

Alternatively, a clamping ring can also be dispensed with if the tensile load acting on the rotatable ring (sliding ring) can be absorbed by the contour of the hand axis (e.g., by a design-related shoulder).

It has already been mentioned above that the protective sheath is attached by its proximal end to the rotatable ring (sliding ring). For this purpose, the rotatable ring (sliding ring) can have a circumferential annular groove in its outer lateral surface, in which the protective sheath is fastened. For this purpose, the proximal end of the protective sheath is pressed into the annular groove and can then be fastened in the annular groove. Alternatively, the sliding ring may have multiple annular grooves so that multiple stocking layers can be independently secured as described.

To fasten the proximal end of the protective sheath in the rotatable ring (sliding ring), a fastening element can be used to fasten the protective sheath in the annular groove of the rotatable ring (sliding ring). For example, this fastening element can be a cable tie that presses the protective sheath into the annular groove and thereby fixes it in the annular groove. Alternatively, it is also possible for the fastening element to be a clamp that is reusable and can be released without being destroyed, with the clamp also pressing the protective sheath into the annular groove and thereby fixing it in the annular groove.

Alternatively, the fastening of the protective sheath ("stocking") to the rotatable ring (sliding ring) can also be achieved by means of Velcro fasteners, snap fasteners, tension bands, rubber bands, adhesive tape or the like.

Alternatively, a reusable clamping device can be used for fastening the protective sheath ("stocking") to the rotatable ring (sliding ring), e.g. with two half-shells connected by a joint, which can be braced in the groove of the sliding ring by means of a clamping screw, so that the protective sheath ("stocking") is braced between sliding ring and clamping device.

In an embodiment of the disclosure, the rotatable ring (sliding ring) consists of two half-shells which are joined together and form the rotatable ring (sliding ring) in the joined state. The fastening element (e.g. cable tie, releasable clamp) for the protective covering can then also hold the two half-shells together, so that a separate connection of the two half-shells, for example by screw tensioning, can be dispensed with on the sliding ring.

Furthermore, it should be mentioned that the immovable ring (clamping ring) can also consist of two half-shells which are joined together to form the immovable ring. The two half-shells of the immovable ring (clamping ring) can be clamped together by a screw connection, whereby the immovable ring (clamping ring) can be clamped at its fastening point on the robot arm of the robot or on the proximal component of the robot hand axis. The immovable ring (clamping ring) is thus fixed at its fastening point here by the clamping connection acting on the two half-shells of the immovable ring.

In an embodiment of the disclosure, the immovable ring (clamping ring) forms on its outer circumferential surface a cylindrical sliding surface on which the rotatable ring (sliding ring) can slide in order to enable the rotational movement of the rotatable ring relative to the immovable ring.

Here, a shoulder may be provided in the immovable ring (clamping ring) adjacent to the sliding surface to prevent the rotatable ring from sliding distally off the immovable ring in response to axial tensile forces on the protective sheath. The aforementioned shoulder thus forms the axial stop that prevents the protective sheath from being pulled down in the distal direction from the ro-boter hand axis.

Alternatively, other bearing variants are also possible, such as ball bearings or roller bearings.

Alternatively, in the case of the slide bearing described above, additional lubrication can be provided to reduce friction. Alternatively, the clamping ring can be provided without a running surface so that the sliding ring is mounted directly on the hand axis surface and can rotate freely thereon around the hand axis.

In this case, to prevent abrasive wear, an adhesive tape can also be applied beforehand to the sliding surface to be provided on the hand axis so that the sliding ring slides freely on the adhesive tape surface.

The distal protective sheath fastening can, for example, have an adhesive tape, as is also the case with the prior art described at the beginning. The adhesive tape then serves to adhere the distal end of the protective sheath to the tool (e.g., rotary atomizer). However, the disclosure is not limited to this method of fastening the protective sheath to the rotary atomizer by means of an adhesive tape.

However, the distal attachment of the protective sheath ("protective stocking") to the atomizer is preferably done in a similar way as in the area of the hand axis. For this purpose, the two-component system described above is used once again: A rigidly fixed clamping ring protects the sliding ring from tensile load so that it can rotate freely, on a surface attached to the clamping ring, around the atomizer axis.

Alternatively, other bearing variants, such as ball or roller bearings, or similar, are also possible.

Alternatively, additional lubrication can be provided to minimize friction.

Alternatively, the clamping ring can be provided without a running surface so that the sliding ring is mounted directly on the atomizer surface and can rotate freely thereon around the atomizer axis.

Alternatively, a clamping ring can be dispensed with if the tensile load acting on the sliding ring is ensured by the contour of the atomizer (e.g. by a design-related shoulder).

Alternatively, a groove can be provided directly in the atomizer contour in which the sliding ring can rotate.

Alternatively, this groove and the sliding ring can also have a special shape (wedge-shaped, asymmetrical, or similar) in the sliding area, so that it is necessary to use both sliding components (special atomizer, special sliding ring).

The protective sheath ("stocking") is fastened in a groove on the upper side of the sliding ring, as in the area of the hand axis, preferably with the aid of a cable tie.

Alternatively, the sliding ring can also have several grooves here, so that several stocking layers can be fastened independently of each other as described.

Alternatively, the protective sheath ("stocking") can also be attached to the sliding ring by means of Velcro fasteners, snap fasteners, drawstrings sewn into the stocking, rubber bands, adhesive tape, or the like.

Alternatively, the reusable clamping device described for the sliding ring in the area of the hand axis can be used to clamp the protective sheath ("stocking") between the sliding ring and the clamping device.

Alternatively, the protective sheath ("stocking") can also be fastened directly to the atomizer surface, without the sliding ring, using all the fastening options mentioned above.

Alternatively, the protective sheath ("stocking") can also have recesses on the side of the atomizer corresponding to the atomizer finger electrode, so that it is possible to hang the stocking on the electrode fingers and thus also ensure distal protective sheath fastening in the atomizer area.

Above, the protective covering according to the disclosure was described as a single component. However, the disclosure also claims protection for a robot hand axis of a robot which is provided with such a protective cover.

Such robot hand axes are known per se from the prior art and therefore need not be described in detail. At this point, it should only be mentioned that the robot hand axis preferably comprises at least three hand axis parts which are adjacent to each other in pairs and can be rotated relative to each other.

Furthermore, it should be mentioned here that the proximal protective sheath fastening can be attached to the proximal hand axis part of the robot hand axis, as has already been briefly mentioned above.

Furthermore, it should be mentioned that the disclosure also claims protection for a robot (e.g. coating robot, painting robot) equipped with such a robot hand axis, wherein the robot hand axis is provided with the protective covering according to the disclosure.

In this case, it is also possible for a plurality of protective sheaths lying one on top of the other to be slided onto the distal robot arm, forming a supply of protective sheaths from which a protective sheaths can be pulled onto the robot hand axis in order to replace a worn-out protective sheath. As an alternative to the supply of protective sheaths, a protective sheath that is not confectioned to length ("endless sheath") may be provided on the robot arm.

The disclosure therefore also claims protection for an operating method for replacing a worn protective sheath with a new protective sheath. For this purpose, the protective sheath fastenings on the proximal side and on the distal side are first loosened. Then the worn protective sheath is removed from the robot hand axis. To do this, the protective sheath can be pulled off the robot hand axis in the distal direction, for example. Then, a new protective sheath is pulled down onto the robot hand axis from the protective sheath supply on the robot arm. Finally, the proximal and distal protective sheath fastenings are fixed. Subsequently, the coating operation can be continued.

FIG. 1 shows a section of a painting robot which can be used in a painting system for painting motor vehicle body components. In the drawings, only a distal robot arm 1 is shown, which is also referred to as "arm 2" in accordance with the usual technical terminology in the field of robot technology, while the proximal robot arm, which is not shown, is referred to as "arm 1". Such painting robots are known per se from the prior art and therefore need not be described in detail here.

A multi-axis robot hand axis 2 is mounted at the end of the distal robot arm 1, which has three hand axis parts 3, 4 and 5 that are rotatable relative to each other.

Mounted on the distal hand axis part 5 of the robot hand axis 2 as an application device is a rotary atomizer 6, which in operation rotates a bell cup 7 at high speed, the bell cup 7 then spraying off the paint to be applied. The design and operation of the rotary atomizer 6 is in itself known from the prior art and therefore need not be described in detail.

Figure 2:
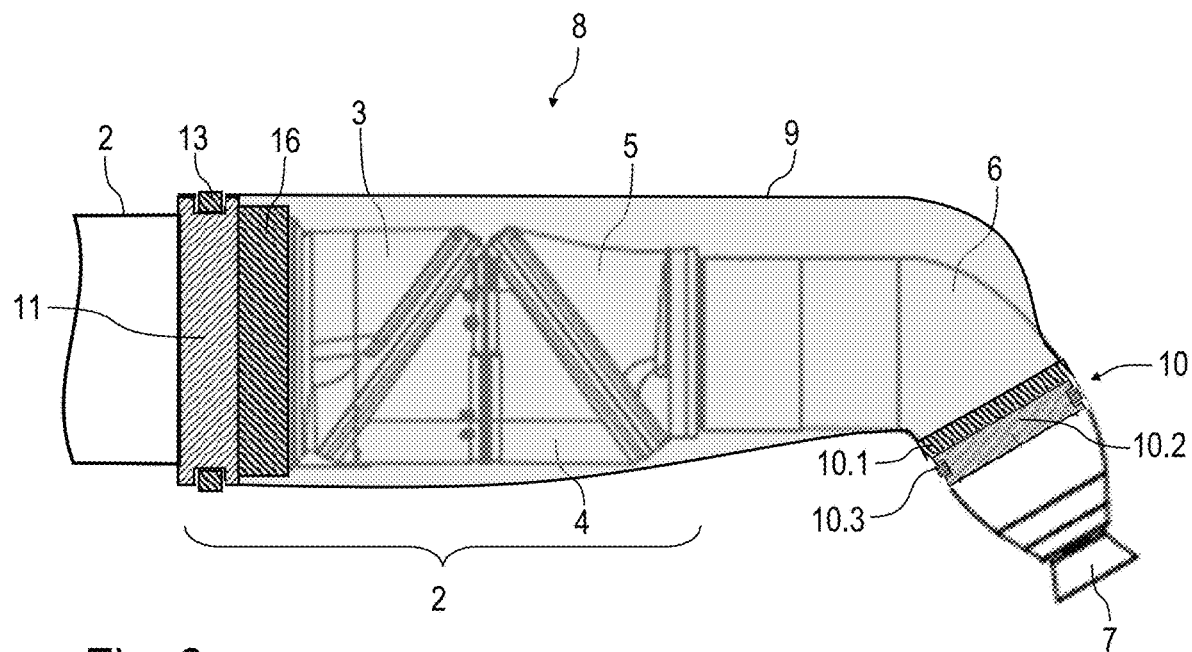
FIG. 2 shows the robot hand axis of FIG. 1 with the protective covering according to the disclosure.

The drawings according to FIG. 1 show the robot hand axis 2 without a protective covering 8 according to the disclosure, which is, however, shown in FIG. 2 and described below.

The protective covering 8 first comprises a protective sheath 9, which consists of a paint-impermeable elastic film that forms a tube.

At its distal end, the protective sheath 9 is attached to the rotary atomizer 6 by a distal protective sheath fastening 10, which will be described in detail.

At its proximal end, the protective sheath 9 is fitted to a rotatable sliding ring 11. For this purpose, the rotatable sliding ring 11 has a circumferential annular groove 12 into which the proximal end of the protective sheath 9 is pressed by a cable tie 13, whereby the proximal end of the protective sheath 9 is firmly connected to the rotatable sliding ring 11. Thus, a rotation of the protective sheath 9 results in a corresponding rotation of the sliding ring 11 and vice versa.

The rotatable sliding ring 11 consists here of two half-shells 14, 15, which are held together by the cable tie 13. This offers the advantage that an additional connecting element for connecting the two half-shells 14, 15 of the rotatable sliding ring 11 can be dispensed with.

Furthermore, the proximal protective sheath fastening comprises a clamping ring 16, which also consists of two half-shells 17, 18, the two half-shells 17, 18 of the clamping ring 16 being held together by a screw connection 19. The screw connection 19 makes it possible here to clamp the clamping ring 16 tightly on the proximal hand axis part 3 and thereby to fix it. The clamping ring 16 is thus immovable relative to the proximal hand axis part 3.

The sliding ring 11 is rotatable on the clamping ring 16 in this case. For this purpose, the sliding ring 11 and the clamping ring 16 are arranged coaxially, with the clamping ring 16 forming a sliding surface on its outer surface on which the sliding ring 11 can rotate.

In addition, the clamping ring 16 has a shoulder 20 at its distal end against which the sliding ring 11 abuts. This means that the shoulder 20 of the clamping ring 16 prevents the sliding ring 11 from sliding off the clamping ring 16 axially in the distal direction. This would namely lead to the protective sheath 9 being pulled down from the robot hand axis 2.

The distal protective sheath fastening 10 is similarly built as the proximal protective sheath fastening described above. For this purpose, the distal protective sheath fastening also has a clamping ring 10.1, a sliding ring 10.2 and a cable tie 10.3. The clamping ring 10.1 is clamped onto the rotary atomizer 6. The sliding ring 10.2 is rotatably mounted on the clamping ring 10.1, wherein the clamping ring 10.1 forms an axial stop for the sliding ring 10.2 so that the sliding ring 10.2 cannot slip off the clamping ring 10.1 in the proximal direction. In the sliding ring 10.2 there is a circumferential annular groove in which the distal end of the protective sheath 9 is fixed by the cable tie 10.3. The protective sheath 9 can therefore rotate together with the sliding ring 10.2 relative to the clamping ring 10.1 and thus also relative to the rotary atomizer 6.

The above-described protective covering 8 according to the disclosure offers the advantage that the protective sheath 9 does not offer any significant resistance to the movements of the robot hand axis 2, since the sliding ring 11 can be rotated relative to the clamping ring 16.

Figure 5:
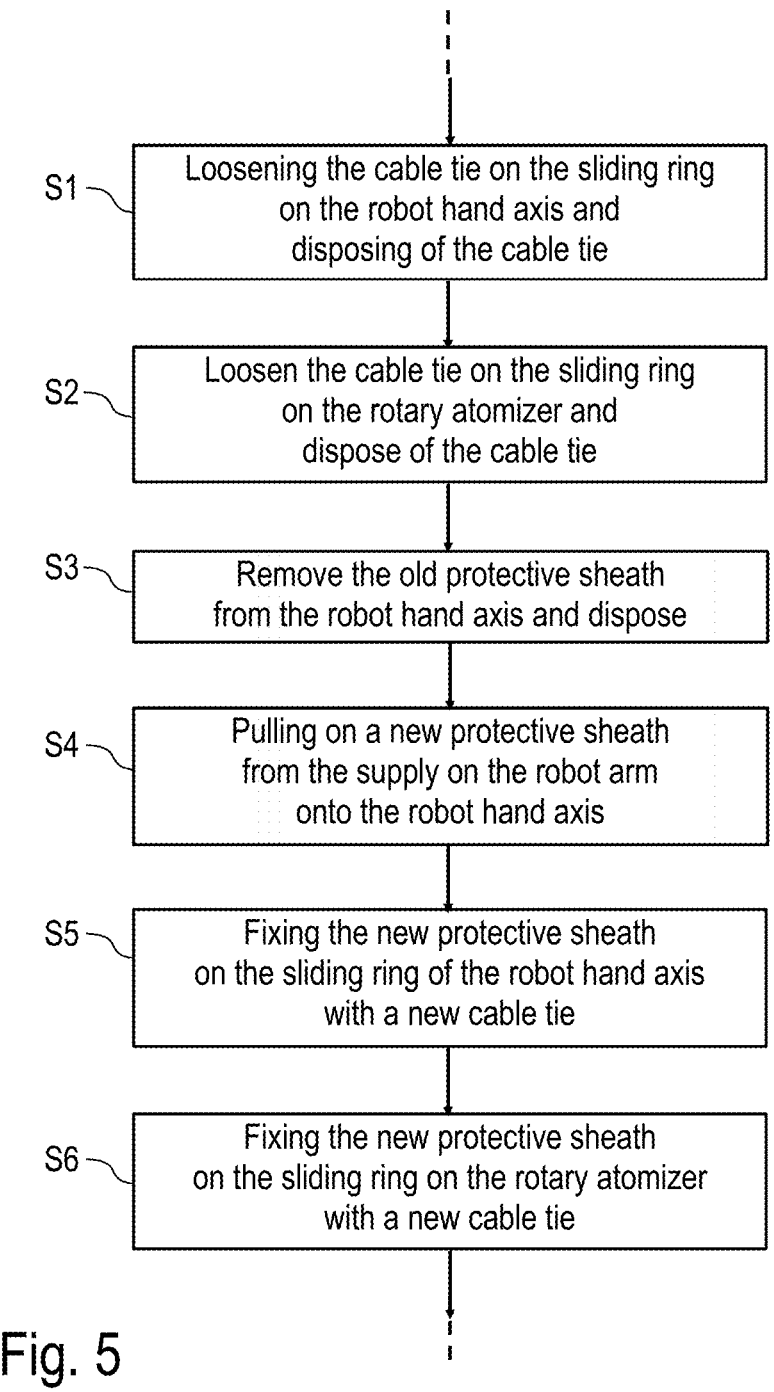
FIG. 5 shows a flow chart illustrating the replacement of a worn protective sheath in the protective covering according to the disclosure.

In the following, the flow diagram according to FIG. 5 is described, which describes a replacement of the worn protective sheath 9.

It should be mentioned here that several such protective sheaths 9 can be slided onto the distal robot arm 1, which then lie on top of each other and form a protective sheath supply.

To replace the worn protective sheath 9, in a first step S1 the cable tie 13 on the rotatable sliding ring 11 is first loosened, whereupon the old cable tie 13 is then removed.

In a second step S2, the cable tie 10.3 is loosened on the sliding ring 10.2 of the rotary atomizer 6, whereupon the cable tie 10.3 is then also disposed of.

Subsequently, in a step S3, the old protective sheath 9 can be axially removed from the robot hand axis 2 and disposed of.

In the next step S4, a new protective sheath 9 is then pulled down axially in the distal direction from the supply of protective sheaths on the distal robot arm 1 until it is in the desired position and covers the robot hand axis 2.

Then, in step S5, the new protective sheath 9 is fixed to the sliding ring 11 by means of a new cable tie 13.

Finally, in step S6, the new protective sheath 9 is then fixed on the rotary atomizer 6 by means of a new cable tie 10.3 on the sliding ring 10.2.

The disclosure is not limited to the preferred embodiment described above. Rather, a large number of variants and variations are possible which also make use of the inventive idea and therefore fall within the scope of protection. In particular, the disclosure also claims protection for the subject-matter and the features of the dependent claims independently of the claims referred to in each case and in particular also without the features of the main claim. The disclosure thus comprises various aspects of disclosure which enjoy protection independently of one another.

The invention claimed is:

1. A protective covering for a robot hand axis of a robot, the robot hand axis being mounted on the one hand on a robot arm and carrying an atomizer on the other hand, the protective covering comprising:
    a) a protective sheath for at least partially enclosing the robot hand axis,
    b) a proximal protective sheath fastening for fastening the protective sheath to a fastening point on a proximal component of the robot hand axis or on the robot arm of the robot, and
    c) a distal protective sheath fastening for fastening the protective sheath to the atomizer, including:
        an immovable ring which is immovably fastened or integrally formed on the atomizer, and a rotatable ring which can be rotated relative to the atomizer, wherein the rotatable ring rests against an axial stop,
    d) wherein the proximal protective sheath fastening allows a rotational movement of the protective sheath relative to the fastening point on the proximal component of the robot hand axis or on the robot arm of the robot.

2. The protective covering according to claim 1, wherein the proximal protective sheath fastening forms an axial stop which absorbs axial tensile forces from the tool and thus prevents the protective sheath from being pulled off the hand axis in the distal direction during operation.

3. The protective covering according to claim 1, wherein
    a) the proximal protective sheath fastening comprises an immovable ring which is immovably attached to or formed on the robot arm of the robot or on a proximal component of the robot hand axis, in particular by means of screw tensioning, and
    b) the proximal protective sheath fastening comprises a rotatable ring which is attached to the immovable ring or bears against the axial stop and is rotatable relative to the immovable ring or relative to the axial stop, and
    c) the protective sheath is attached to the rotatable ring so that the protective sheath can rotate with the rotatable ring relative to the robot arm.

4. The protective covering according to claim 3, wherein the rotatable ring has at least a circumferential annular groove in its outer lateral surface, in which the protective sheath is fastened.

5. The protective covering according to claim 4, wherein the protective sheath is fastened in the annular groove of the rotatable ring by means of a fastening element, the fastening element fixing the protective sheath in the annular groove of the rotatable ring.

6. The protective covering according to claim 5, wherein
    a) the rotatable ring consists of two half-shells, and
    b) the fastening element for the protective sheath also holds the two half-shells of the rotatable ring together.

7. The protective covering according to claim 5, wherein the fastening element of the proximal protective sheath fastening is a cable tie which is tensioned in the annular groove and presses the protective sheath into the annular groove.

8. The protective cover according to claim 5, wherein the fastening element of the proximal protective sheath fastening is a reusable and non-destructively releasable clamp which presses the protective sheath into the annular groove.

9. The protective cover according to claim 5, wherein the fastening element of the proximal protective sheath fastening comprises at least one of a hook-and-loop fastener, a snap fastener and a pull strap.

10. The protective cover according to claim 5, wherein the fastening element of the proximal protective sheath fastening is formed by two half-shells lying on the outside around the rotatable ring, so that the protective sheath is braced between the half-shells and the rotatable ring.

11. The protective covering according to claim 3, wherein
    a) the immovable ring consists of two half-shells which are joined together to form the immovable ring, and b) the two half-shells of the immovable ring are clamped together by a screw connection and thereby clamp the immovable ring at its fastening point to the robot arm of the robot or to a proximal component of the robot hand axis.

12. The protective covering according to claim 3, wherein the immovable ring forms on its outer circumferential surface or the outer surface of the robot hand axis a sliding surface on which the rotatable ring can slide in order to allow a rotational movement of the rotatable ring relative to the immovable ring or relative to the robot hand axis, respectively.

13. The protective cover according to claim 12, wherein the immovable ring has a shoulder on the distal side of the sliding surface in order to prevent the rotatable ring from slipping off the immovable ring in the distal direction in the event of axial tensile forces on the protective sheath.

14. The protective cover according to claim 12, wherein the sliding surface on the outer surface of the robot hand axis is stuck with a friction-reducing adhesive tape or is lubricated with a lubricant for friction reduction.

15. The protective covering according to claim 1, wherein the distal protective sheath fastening comprises at least one of an adhesive tape, a push button and a tension band, the protective sheath being fastened to the tool therewith.

16. The protective cover according to claim 1, wherein
a) the protective sheath is elastic,
b) the protective sheath is impermeable to paint, and
c) that the protective sheath consists of a film.

17. The protective cover according to claim 1, wherein the rotatable ring of the distal protective sheath fastening is rotatably attached to the immovable ring of the distal protective sheath fastening.

18. The protective cover according to claim 1, wherein the rotatable ring of the distal protective sheath fastening is rotatably guided in an annular groove in the outer surface of the atomizer.

19. The protective cover according to claim 1, wherein the protective sheath is fastened by its distal end to the rotatable ring, so that the protective sheath can rotate with the rotatable ring relative to the atomizer.

20. The protective covering according to claim 1, wherein
a) the protective sheath has holes for the passage of external charging electrodes, and
b) the holes located in the protective sheath for the external charging electrodes form the distal protective sheath fastening.

* * * * *